United States Patent
Xu et al.

(10) Patent No.: US 12,223,699 B2
(45) Date of Patent: Feb. 11, 2025

(54) MULTIMODAL MACHINE LEARNING IMAGE AND TEXT COMBINED SEARCH METHOD

(71) Applicant: SAP SE, Walldorf (DE)

(72) Inventors: Lei Xu, Shanghai (CN); Deng Feng Wan, Shanghai (CN)

(73) Assignee: SAP SE, Walldorf (DE)

( * ) Notice: Subject to any disclaimer, the term of this patent is extended or adjusted under 35 U.S.C. 154(b) by 428 days.

(21) Appl. No.: 17/740,479

(22) Filed: May 10, 2022

(65) Prior Publication Data
US 2023/0368509 A1 Nov. 16, 2023

(51) Int. Cl.
*G06V 10/80* (2022.01)
*G06F 40/20* (2020.01)
*G06N 20/20* (2019.01)
*G06V 10/74* (2022.01)
*G06V 10/82* (2022.01)

(52) U.S. Cl.
CPC ............ *G06V 10/806* (2022.01); *G06F 40/20* (2020.01); *G06N 20/20* (2019.01); *G06V 10/761* (2022.01); *G06V 10/82* (2022.01)

(58) Field of Classification Search
CPC .... G06V 10/806; G06V 10/761; G06V 10/82; G06F 40/20; G06F 40/30; G06N 20/20; G06N 3/0464
See application file for complete search history.

(56) References Cited

U.S. PATENT DOCUMENTS

| | | | | |
|---|---|---|---|---|
| 11,461,384 | B2 * | 10/2022 | Hussain | G06F 18/22 |
| 2021/0090257 | A1 * | 3/2021 | Bhatia | G06T 7/11 |
| 2021/0124976 | A1 * | 4/2021 | Kim | G06V 10/82 |
| 2021/0182105 | A1 | 6/2021 | Wan | |
| 2021/0182183 | A1 | 6/2021 | Wan | |
| 2021/0390700 | A1 * | 12/2021 | Lee | G06F 18/25 |
| 2021/0397625 | A1 | 12/2021 | Wan et al. | |

(Continued)

OTHER PUBLICATIONS

Devlin et al., "Bert: Pre-training of deep bidirectional transformers for language understanding." arXiv preprint arXiv:1810.04805, Oct. 2018, 16 pages.

(Continued)

*Primary Examiner* — Umair Ahsan
(74) *Attorney, Agent, or Firm* — Fish & Richardson P.C.

(57) ABSTRACT

Methods, systems, and computer-readable storage media for a multimodal machine learning image and text combined search method. One example method includes processing items that each have an associated image and a textual description. A first image feature vector is generated by processing a first image using a first machine learning model. A first textual feature vector is generated by processing a first textual description using a second machine learning model. The first image feature vector and the first textual feature vector are combined to generate a first combined feature vector for a first item. Similarity lists of similar items are generated for the first item based on similarities between the first image feature vector, the first text feature vector, the first combined feature vector and respective corresponding vectors of other items. The similarity lists for the first item are combined to generate a combined similarity list for the first item.

17 Claims, 12 Drawing Sheets

Combined Similarity Matrix

| | A | B | C | D |
|---|---|---|---|---|
| A | 1 | 0.8 | 0.3 | 0.6 |
| B | 0.8 | 1 | 0.6 | 0.5 |
| C | 0.3 | 0.6 | 1 | 0.6 |
| D | 0.6 | 0.5 | 0.6 | 1 |
| E | 0.7 | 0.4 | 0.6 | 0.8 |

(56) References Cited

U.S. PATENT DOCUMENTS

2022/0036127 A1* 2/2022 Lin .................. G06T 11/00
2023/0177581 A1* 6/2023 Ren .................. G06Q 30/0282
705/26.7

OTHER PUBLICATIONS

Projectpro.io [online], "BERT NLP Model Explained For Complete Beginners" Feb. 21, 2022, [retrieved on Apr. 27, 2022], retrieved from : URL <https://www.projectpro.io/article/bert-nlp-model-explained/558>, 17 pages.

Pytorch.org [online], "EFFICIENTNET" Mar. 2022, [retrieved on Apr. 27, 2022], retrieved from : URL <https://pytorch.org/hub/nvidia_deeplearningexamples_efficientnet/>, 3 pages.

Tan et al., "Efficientnet: Rethinking model scaling for convolutional neural networks." International conference on machine learning. PMLR, May 2019, 10 pages.

* cited by examiner $$\text{CosineSimilarity}(u, v) = \frac{u \cdot v}{\|u\|_2 \|v\|_2} = \cos(\theta)$$

Image Similarity Matrix

| | A | B | C | D |
|---|---|---|---|---|
| A | 1 | 0.8 | 0.2 | 0.3 |
| B | 0.8 | 1 | 0.6 | 0.5 |
| C | 0.2 | 0.6 | 1 | 0.8 |
| D | 0.5 | 0.5 | 0.8 | 1 |
| E | 0.5 | 0.5 | 0.5 | 0.8 |

FIG. 7A

Text Similarity Matrix

| | A | B | C | D |
|---|---|---|---|---|
| A | 1 | 0.6 | 0.3 | 0.9 |
| B | 0.6 | 1 | 0.8 | 0.4 |
| C | 0.3 | 0.8 | 1 | 0.4 |
| D | 0.9 | 0.6 | 0.4 | 1 |
| E | 0.6 | 0.5 | 0.6 | 0.9 |

FIG. 7B

Combined Similarity Matrix

| | A | B | C | D |
|---|---|---|---|---|
| A | 1 | 0.8 | 0.3 | 0.6 |
| B | 0.8 | 1 | 0.6 | 0.5 |
| C | 0.3 | 0.6 | 1 | 0.6 |
| D | 0.6 | 0.5 | 0.6 | 1 |
| E | 0.7 | 0.4 | 0.6 | 0.8 |

FIG. 7C

Filtered Matches Based on Image Embedding Similarity, Threshold of 0.6

```
A:  B(0.8),  E(0.8)
B:  A(0.8),  C(0.6)
C:  B(0.6),  D(0.8)
D:  C(0.8),  E(0.8)
E:  D(0.8)
```
⟵ 802
⟵ 810

Filtered Matches Based on Text Embedding Similarity, Threshold of 0.6

```
A:  B(0.6),  D(0.9),  E(0.6)
B:  A(0.6),  C(0.8)
C:  B(0.8),  E(0.6)
D:  A(0.9),  C(0.6),  E(0.9)
E:  A(0.6),  C(0.6),  D(0.9)
```
⟵ 804

Filtered Matches Based on Combine Embedding Similarity, Threshold of 0.6

```
A:  B(0.8),  D(0.6),  E(0.7)
B:  A(0.8),  C(0.6)
C:  B(0.6),  D(0.6),  E(0.6)
D:  A(0.6),  C(0.6),  E(0.8)
E:  A(0.7),  C(0.6),  D(0.8)
```
⟵ 806

Joint Similarity Lists

```
A:  B(avg(0.8,0.6,0.8)),  D(avg(0.9,0.6)),  E(avg(0.8,0.6,0.7))   = B(0.73),  D(0.75),  E(0.7)
B:  A(avg(0.8,0.6,0.8)),  C(avg(0.6,0.8,0.6))                     = A(0.73),  C(0.67)
C:  B(avg(0.6,0.8,0.6)),  D(avg(0.8,0.7,0.6)),  E(avg(0.6,0.6,0.6)) = B(0.6),  D(0.67),  E(0.6)
D:  A(avg(0.9,0.6)),  C(avg(0.8,0.6,0.6)),  E(avg(0.8,0.9,0.8))   = A(0.75),  C(0.67),  E(0.83)
E:  A(avg(0.8,0.6,0.7)),  C(avg(0.6,0.6,0.6)),  D(avg(0.8,0.9,0.8)) = A(0.7),  C(0.6),  D(0.83)
```
⟵ 816
⟵ 818
⟵ 820
⟵ 814
⟵ 812
⟵ 808

MULTIMODAL MACHINE LEARNING IMAGE AND TEXT COMBINED SEARCH METHOD

BACKGROUND

Different approaches can be used by a search system to automatically identify items that match a received search request. For example, a search request may include an image and the search system can use image processing to identify similar images in an image repository that have highest image match scores relative to the received image. As another example, a search request may include a text value and the search system can use text matching to identify documents that have highest text matching scores relative to the received text value. However, both image- and text-based searches can suffer from match accuracy issues caused from noise.

SUMMARY

Implementations of the present disclosure are directed to a multimodal machine learning image and text combined search method.

In some implementations, actions include: receiving from a repository a plurality of items, wherein each item has an image and a textual description associated therewith; generating a first image feature vector, for a first item, by processing a respective image using a first machine learning model; generating a first textual feature vector, for the first item, by processing a respective textual description using a second machine learning model; combining, for the first item, the first image feature vector for the first item and the first textual feature vector for the first item, to generate a first combined feature vector for the first item; generating, for the first item, a first similarity list of similar items, wherein a first similar item is included in the first similarity list based on a similarity between the first image feature vector for the first item and a similar image feature vector for the similar item; generating, for the first item, a second similarity list of similar items, wherein a second similar item is included in the second similarity list based on a similarity between the first text feature vector for the first item and a similar text feature vector for the second similar item; generating, for the first item, a third similarity list of similar items, wherein a third similar item is included in the third similarity list based on a similarity between the first combined feature vector for the first item and a similar combined feature vector for the third similar item; combining the first similarity list for the first item, the second similarity list for the first item, and the third similarity list for the first item to generate a combined similarity list for the first item; receiving a request for information for the first item; retrieving the combined similarity list of similar items for the first item; and providing the combined similarity list of similar items for the first item in response to the request.

These and other implementations can each optionally include one or more of the following features. A similar item can be included in the first similarity list for the first item based on a cosine similarity value between the image feature vector of the similar item and the image feature vector of the first item being more than a predetermined threshold. A similar item can be included in the second similarity list for the first item based on a cosine similarity value between the textual feature vector of the similar item and the textual feature vector of the first item being more than a predetermined threshold. A similar item can be included in the third similarity list for the first item based on a cosine similarity value between the combined feature vector of the similar item and the combined feature vector of the first item being more than a predetermined threshold. Generating first similarity lists, second similarity lists, and third similarity lists can include generating respective similarity matrices. An entry in a given similarity matrix can be a similarity value between respective image feature vectors, textual feature vectors, or combined feature vectors of two items in the repository. Creating the combined similarity list of similar items for the first item can include: identifying a first set of similar items for the first item that are in only one of the first similarity list for the first item, the second similarity list for the first item, or the third similarity list for the first item; and including the first set of similar items and respective similarity values for the first set of similar items in the combined similarity list of similar items for the first item. Creating the combined similarity list of similar items for the first item can include: identifying a second set of similar items for the first item that are in more than one of the first similarity list for the first item, the second similarity list for the first item, or the third similarity list for the first item; determining an average similarity value for the second set of similar items; and including the second set of similar items and the average similarity value for the second set of similar items in the combined similarity list of similar items for the first item. The first machine learning model can be a neural network model and the second machine learning model can be a natural language processing model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 7A, 7B, and 7C illustrate an image similarity matrix, a text similarity matrix, and a combined similarity matrix, respectively.

FIG. 8 is a diagram that illustrates filtering and joining operations performed on similarity lists.

Like reference symbols in the various drawings indicate like elements.

DETAILED DESCRIPTION

Figure 1:
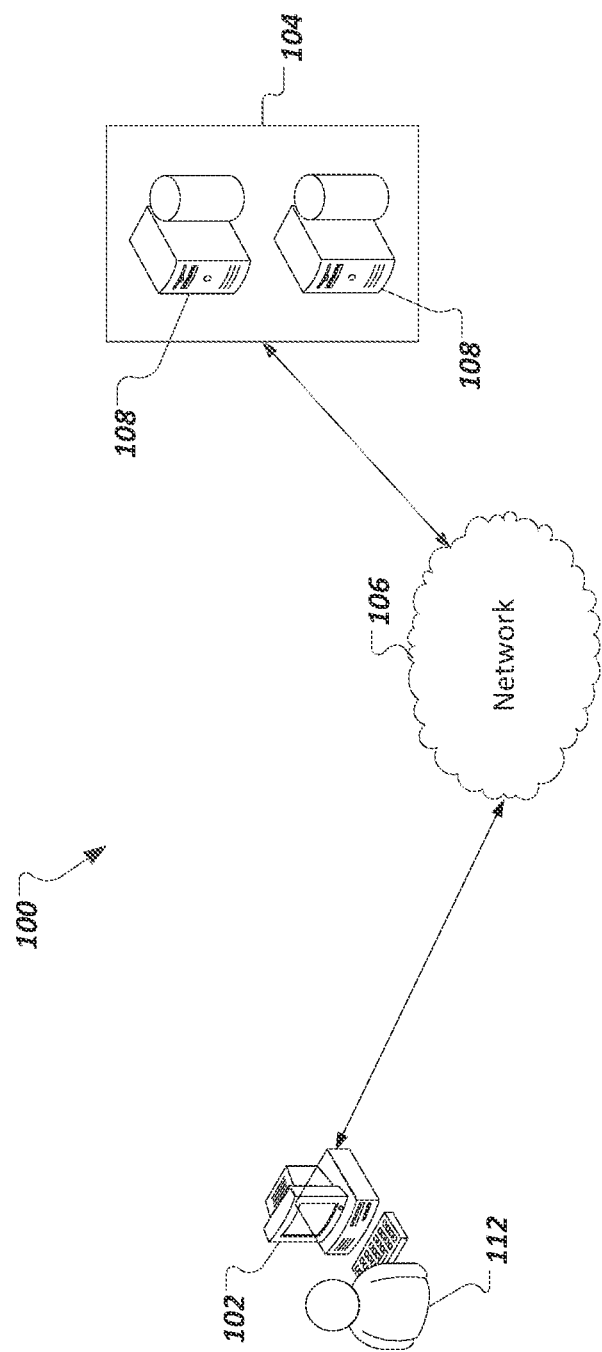
FIG. 1 depicts an example architecture that can be used to execute implementations of the present disclosure.

Implementations of the present disclosure are directed to a multimodal machine learning image and text combined search method.

Enterprise and cloud software providers can offer various services. For example, an enterprise or cloud software provider can enable users to search for items in a repository. Repository items can have, for example, both images and textual descriptions. Traditional image-matching approaches may match an image using a histogram, for example. However, traditional image-matching approaches may surface results that produce image matches based on noise rather than image features of interest to the user. As another example, traditional text-matching approaches may find matching text values using regular expressions. However, regular-expression matching can also surface results that produce text matches based on noise rather than text features of interest to the user. Accordingly, independent, separate approaches for searching for items using either an image-based or a text-based search may not yield satisfactory results. For example, noise caused by image matches or text matches that are not of interest to a user may cause search results to be unsatisfactory or even unusable.

In view of the above, implementations of the present disclosure provide a combined multimodal approach to perform searches using one or more machine learning (ML) models. As described in further detail herein, implementations of the present disclosure combine item image features and item text features to identify most similar items for each item in a repository.

The multimodal search of the present disclosure provides technical advantages. For example, implementations of the present disclosure provide time- and resource-efficient searching of data repositories to more efficiently identify similar items for an item. Providing more accurate items of interest more quickly can result in resource savings since improved search results generally result in users performing less searches than for less-efficient search approaches that perform searches based on just image features or just text features. Users performing less searches results in the use of less computing resources of a user device, less use of network bandwidth (due to fewer requests sent to a search system), and less use of computing resources by the search system due to handling fewer search requests. Additionally, a repository of items that includes both an image and a textual description for each item can be preprocessed to determine, for each pair of items, a combined match score for the pair of items that is based on both image and textual similarity to the item. Preprocessing the repository can include generating, for each item in the repository, a sorted similarity list of similar items that are sorted by combined match scores. The preprocessed sorted similarity lists can be referenced to return most-similar items for a given item in response to a user request. Providing preprocessed similarity lists not only decreases lag time when responding to user requests but also saves computing resources by avoiding repeated on-demand processing for generating search results.

As described in further detail herein, multimodal search of the present disclosure generates more accurate results by using both trained image feature exaction models and text feature extraction models. Further, image features and text features for items are combined and compared to other combined features sets of other items. Graph blending is used to further refine lists of similar items. The multimodal, multifaceted approach can identify items that are determined to be the most similar to respective items, by comparing image, text, and combined feature vectors. More particularly, and as described in further detail herein, an item can be determined to be a most similar item in response to a similarity score exceeding a threshold similarity score. Combining image and text feature vectors results in consideration of both image attributes and text attributes which can eliminate bias that may occur when only text or only image features are considered. Accordingly, a combined approach can generally produce more accurate search results.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can host an item repository of items where each item has an image and a textual description. The server system 104 can also provide a search service whereby a multimodal comparison process is performed to identify most-similar items for each item in the repository based on both image features and text features. The user 112 can use the client device 102 to view information about a particular item and about items that are most-similar to the particular item, such as when viewing search results or when browsing a directory of the items repository. The server system 104 can be configured to identify, retrieve and provide information about most-similar items, based on combined text and image aspects of items in the repository.

Figure 2:
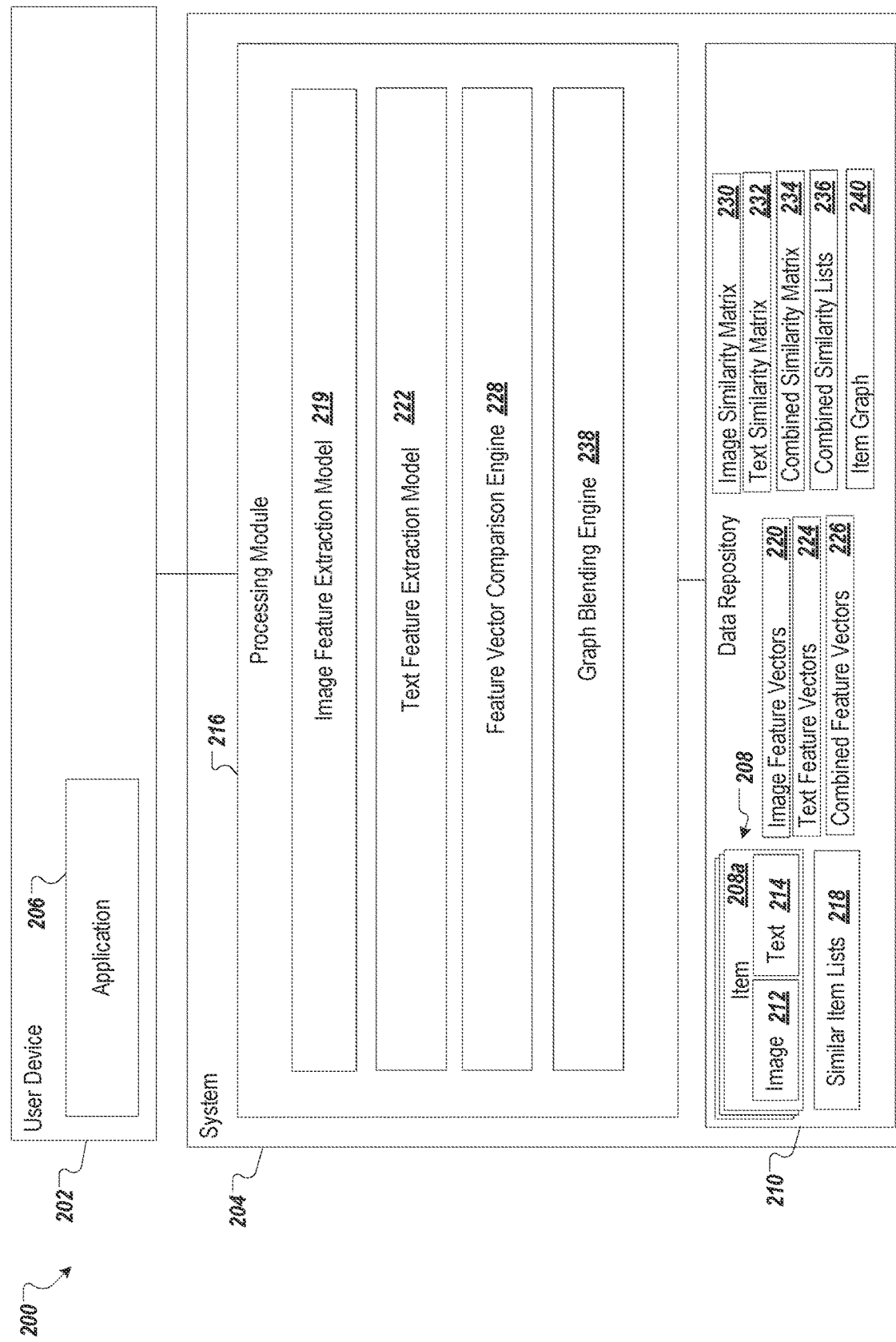
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a user device 202 and a server system 204. A user of the user device 202 can use an application 206 to browse and/or search for items 208 in a repository 210. Each of the items 208, such as an item 208a, can include an image (e.g., an image 212) and a textual description (e.g., a text value 214). The application 206 can be configured to request information from the server system 204 about a particular item (e.g., based on a user selection or a user browsing input). In response to a request for information about a particular item 208, a processing module 216 of the server system 204 can determine and provide, to the application 206, information about the item and also information about a set of similar items that are most similar to the item.

In some implementations, the processing module 216 determines similar items that are most similar to an item by retrieving information from a similar item list for the item that is stored in a repository of the similar item lists 218. The processing module 216 can build and maintain the similar item lists 218, for example. For instance, to generate the similar item lists 218, the processing module 216 can use an image feature extraction model 219 (e.g., a CNN (Convolutional Neural Network) model) to generate image feature vectors 220 for each of the items 208. The processing module 216 can also use a text feature extraction model 222 (e.g., a NLP (Natural Language Processing) model) to generate text feature vectors 224 for each of the items 208. The processing module 216 can combine, for respective items, image feature vectors 220 and text features vectors 224 to generate combined feature vectors 226.

A feature vector comparison engine 228 can compare respective image feature vectors 220 of the items 208 to generate an image similarity matrix 230. Similarly, the feature vector comparison engine 228 can compare respective text feature vectors 224 and respective combined feature vectors 226 to generate a text similarity matrix 232 and a combined similarity matrix 234, respectively. Each similarity matrix can include a similarity value for each combination of two items that indicates a degree of similarity between respective feature vectors of the two items. In some implementations, the processing module 216 can perform thresholding to filter the image similarity matrix 230, the text similarity matrix 232, and the combined similarity matrix 234 to remove similarity values that are less than or equal to a predetermined threshold. After thresholding, the image similarity matrix 230, the text similarity matrix 232, and the combined similarity matrix 234 can include respective similarity lists for each item that indicate which other items' respective feature vectors are similar to the respective feature vector of the item.

The processing module 216 can create combined similarity lists 236. To create a combined similarity list 236 for a given item, the processing module 216 can merge the image similarity list for the item, the text similarity list for the item, and the combined similarity list for the item. In some implementations, the server system 204 can return information in the combined similarity lists 236 in response to a request. However, in other implementations, a graph blending engine 238 generates an item graph 240 based on the combined similarity lists 236 and performs graph blending to refine the combined similarity lists 236 to generate the similar item lists 218. Graph blending and further details about operations of the processing module 216 are described in more detail below.

Figure 3:
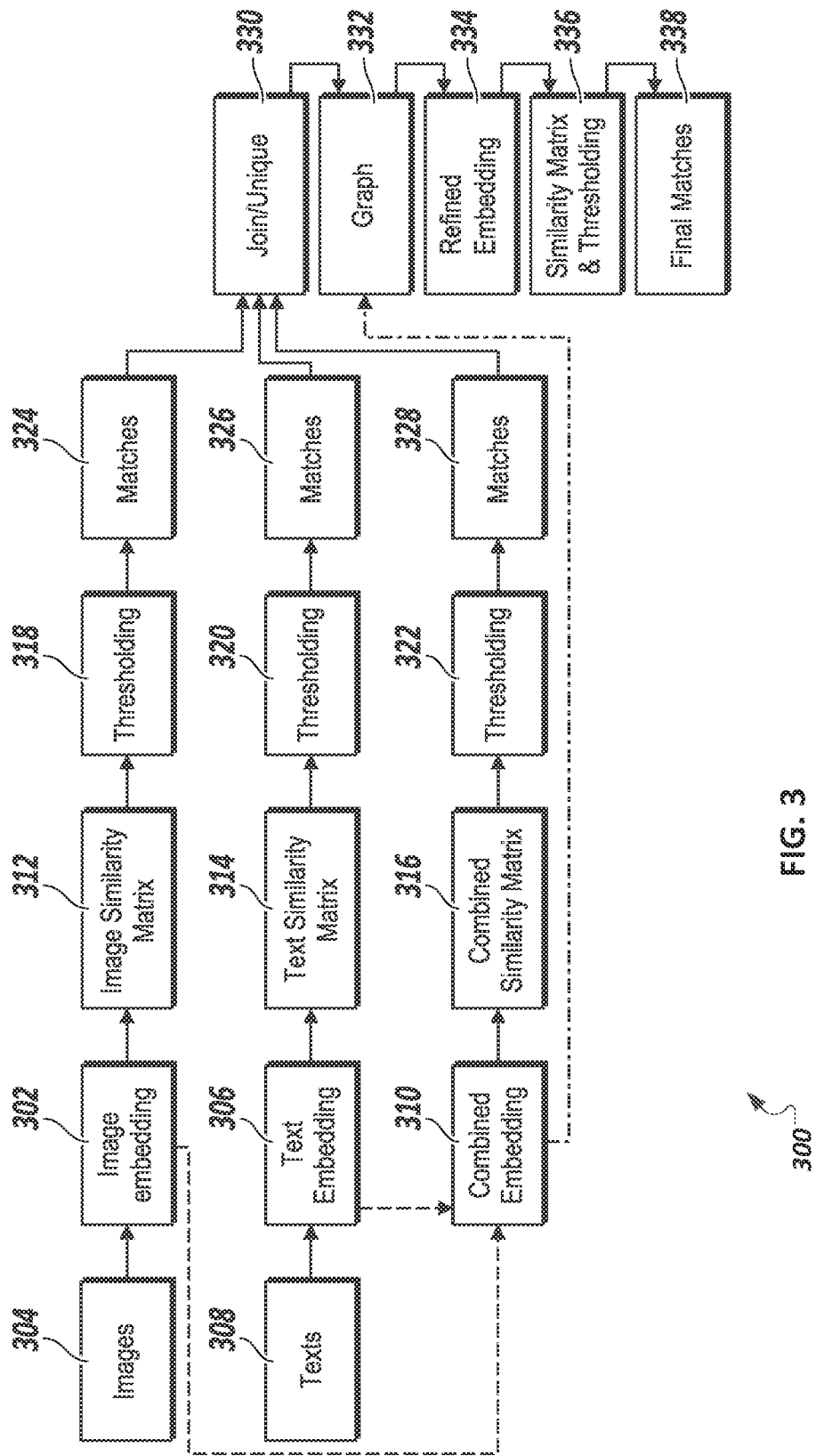
FIG. 3 is a flowchart of an example method for generating similarity lists for items using machine learning.

FIG. 3 is a flowchart of an example method 300 for generating similarity lists for items using machine learning. Image embeddings 302 (e.g., image features, such as length, width and depth measurements; ratios of length:width, width:depth and length:depth; number of edges; number of vertices; angles between edges; rounded surfaces, colors; patterns; textures; shapes of objects; etc.) are extracted from images 304 of items in a repository using a first machine learning model. The image embeddings 302 can be, for example feature vectors of features of the images 304 that are extracted using the first machine learning model. The first machine learning model can be, for example, a neural network model. Image embedding generation is described in more detail below with respect to FIG. 4.

Text embeddings 306 (e.g., text features, such as word matching, synonym identification; antonym identification, semantic meaning, etc.) are extracted from text portions 308 of items in the repository using a second machine learning model. The text embeddings 306 can be, for example, feature vectors of features of the text portions 308 that are extracted using the second machine learning model. The second machine learning model can be, for example, a NLP model. Text feature extraction is described in more detail below with respect to FIG. 5.

Combined embeddings 310 are generated for each item in the repository based on the image feature vector for the item and the text feature vector for the item. For example, for a given item, combined embeddings 310 can be generated by concatenating the image feature vector for the item and the text feature vector for the item. Generation of combined embeddings is described in more detail below with respect to FIG. 6.

An image similarity matrix 312, a text similarity matrix 314, and a combined similarity matrix 316 are generated, for each item, based on the image embeddings 302, the text embeddings 306, and the combined embeddings 310, respectively. Each of the image similarity matrix 312, the text similarity matrix 314, and the combined similarity matrix 316 can include a respective image similarity list, a text similarity list, or a combined similarity list for each item in the repository, respectively. A given similarity list can include similarity values that each measure a similarity between an item's embeddings (e.g., image embeddings 302, text embeddings 306, or combined embeddings 310) and corresponding embeddings of another item in the repository. A given similarity value can represent a degree of similarity between two embedding vectors.

As described below with respect to FIGS. 7A-7C, similarity values can be cosine similarity values. A similarity list for a specific item for an embeddings type can be expressed as:

Similarity List(item $k$)=[cos($k$,1),cos($k$,2) . . . cos($k$, $N$)]

where k is the specific item and N indicates a count of items. In some implementations, a similarity list includes a similarity value of 1 that represents an item's comparison to itself. In other implementations, a self-comparison value is omitted from similarity lists.

Each of the image similarity matrix 312, the text similarity matrix 314, and the combined similarity matrix 316 can include N similarity lists, with each similarity list corresponding to one repository item. A similarity matrix can be expressed as:

Similarity Matrix=[Sim. List(item 1),Sim. List(item 2), . . . Sim. List(item $N$)]$^T$ where T indicates a transform.

After the image similarity matrix 312, the text similarity matrix 314, and the combined similarity matrix 316 are generated, respective thresholding processes 318, 320, or 322 are performed to filter the respective image similarity matrix 312, the text similarity matrix 314, or the combined similarity matrix 316 to generate filtered matches 324, 326, or 328. The filtered matches 324, 326, and 328 can include similarity lists for each item that only have similarity values that are more than a predetermined threshold similarity value. A filtered similarity list for a given item for a given embedding type (e.g., image, text, or combined embedding) can be expressed as:

Filtered Similarity List(item $k$)=[cos($k,i$),cos($k,j$) . . . cos($k,m$)]

where the similarity values that remain are those similarity values that are more than the threshold. Same or different thresholds can be used to filter image similarity lists, text similarity lists, or combined similarity lists. A set of matching items can be determined from a filtered similarity list. For instance, a set of matching items for a given item can be expressed as:

Matching items($k$)=[$i,j$, . . . ,$m$]

Through thresholding, for each given item, filtered matches 324, 326, and 328 can be generated that include similarity values above a respective threshold that identify other items that have similar image embeddings 302, similar text embeddings 306, or similar combined embeddings 310, respectively. A join process 330 can be used to merge the filtered matches 324, 326, and 328 for an item into a joint similarity list for the item. The join process 330 can be used to determine an average similarity value when a given similar item is included in more than one of the filtered matches 324, 326, and 328 for the item. The join process 330 (and filtering and thresholding) are described in more detail below with respect to FIG. 8.

The joint similarity lists can be used to create an item graph 332. The item graph 332 can include nodes for items and weighted edges between nodes, where a weight is based on similarity values for connected items that are included in respective joint similarity lists. A graph blending process that uses edge weights of the weighted edges of the item graph 332 can be used to create refined embeddings 334 for each item. A similarity matrix 336 can be generated using the refined embeddings 334. The similarity matrix 336 can be generated using a similar process as for the image similarity matrix 312, the text similarity matrix 314, and the combined similarity matrix 316. Further thresholding and sorting can be performed to generate final matches 338 (e.g., a further refined list of similar items) for each item in the repository. The item graph 332, graph blending, and generation of the refined embeddings 334 and the final matches 338 are described in more detail below with respect to FIG. 10.

Figure 4:
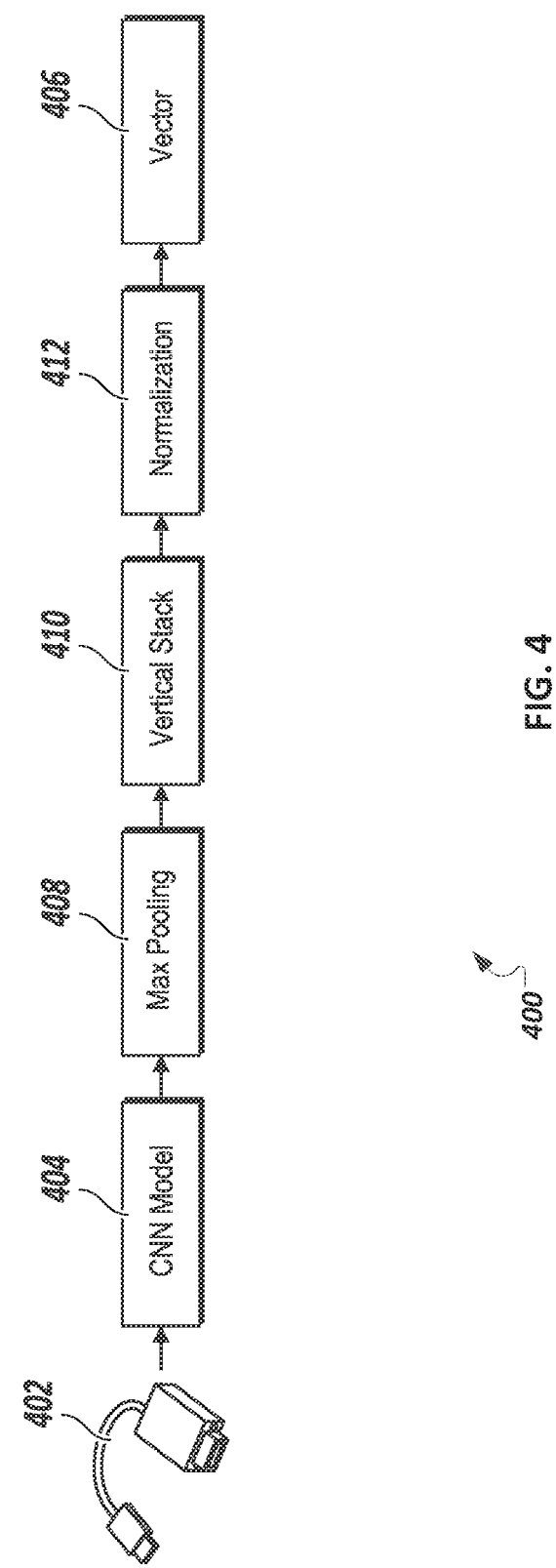
FIG. 4 illustrates a process for image feature extraction using machine learning.

FIG. 4 illustrates a process 400 for image feature extraction using machine learning. The process 400 is described for an example item image 402. The process 400 can be performed for each item in an item repository.

The image 402 can be provided, for example, to a trained CNN model 404. Although a CNN model 404 is described, other types of models can be used that are trained to extract features of an image. The trained CNN model 404 can be trained to extract a feature vector 406 of features from an input image such as the image 402.

In some implementations, the trained CNN model 404 is a neural network model that is trained for image classification. However, the process 400 can be configured to use the trained CNN model 404 without using a final classification layer of the model. That is, the process 400 can use the trained CNN model 404 to generate the feature vector 406 from the image 402 without classifying the image. In some implementations, the classification layer is removed from the trained CNN model 404, and in other implementations the classification layer is present in the trained CNN model 404 but is not used.

In some implementations, RGB (Red, Green, Blue) values (e.g., an RGB matrix) for the image 402 are provided as input to the trained CNN model 404. In some implementations, a max pooling process 408 is applied to the RGB matrix. A vertical stack process 410 can be performed to an output matrix of the max pooling to convert a two-dimensional matrix into a one-dimension vector. A normalization operation 412 can be performed to generate the feature vector 406.

Figure 5:
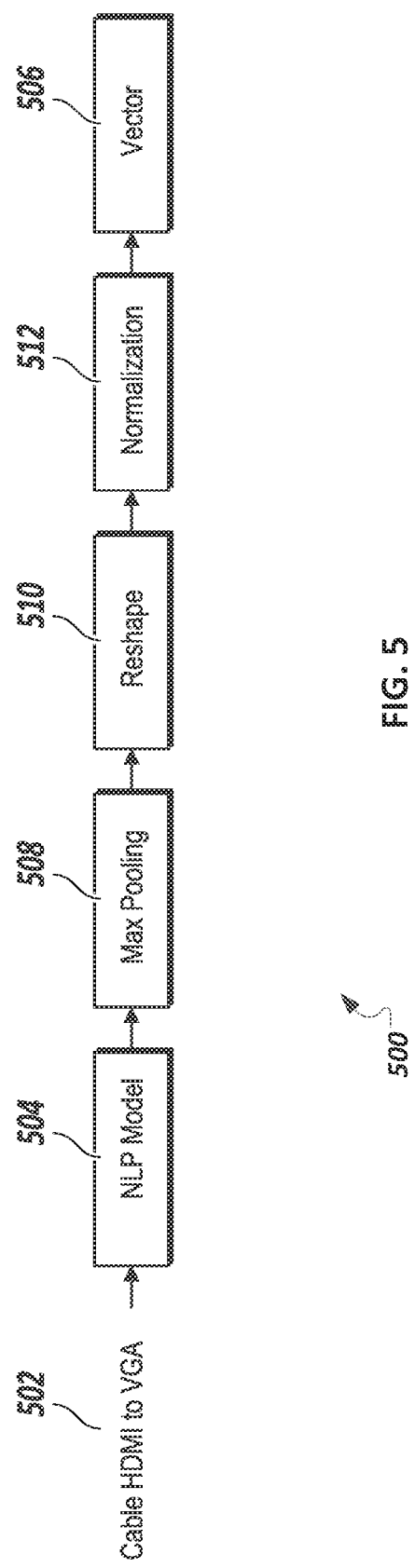
FIG. 5 illustrates a process for text feature extraction using machine learning.

FIG. 5 illustrates a process 500 for text feature extraction using machine learning. The process 500 is described for an example text value 502. The process 500 can be performed for each item in an item repository.

The text value 502 can be provided, for example, to a trained NLP model 504. Although an NLP model is described, other types of models can be used that are trained to extract features of text values. The trained NLP model 504 can be trained to extract a feature vector 506 of features from input text such as the text value 502. In some implementations, the trained NLP model 504 is trained to generate embeddings that represent the contextual meaning of words in input text. The trained NLP model 504 can generate feature vectors such as the feature vector 506 that encode the meaning of input text such that output feature vectors that are more similar in a vector space are expected to be more similar in meaning than feature vectors that are less similar in the vector space.

The trained NLP model 504 can generate an intermediate matrix from the text value 502. A max pooling process 508 can be performed to condense the intermediate matrix and a reshaping process 510 can be performed to reshape a condensed matrix into an intermediate vector. A normalization process 512 can be performed on the intermediate vector to generate the feature vector 506.

Figure 6:
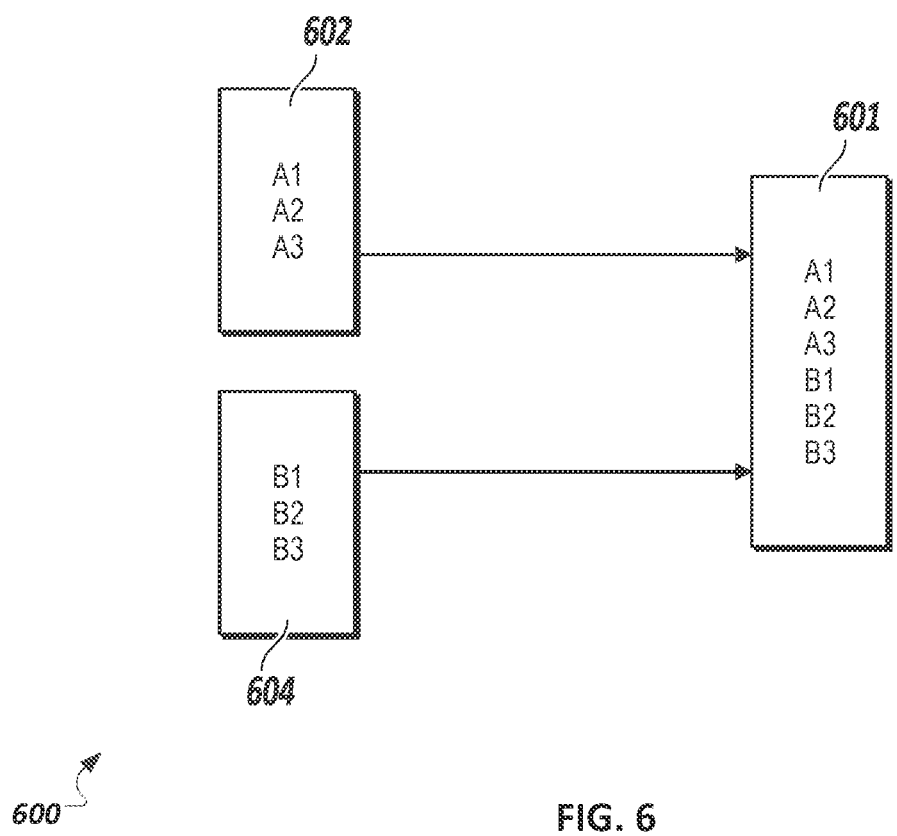
FIG. 6 is a diagram that illustrates generation of combined embeddings for an item.

FIG. 6 is a diagram 600 that illustrates generation of combined embeddings 601 for an item. The combined embeddings 601 can correspond to the combined embeddings 310 described above with respect to FIG. 3. As described above, an image feature vector 602 (e.g., the image embeddings 302) and a text feature vector 604 (e.g., the text embeddings 306) can be generated for an item. The combined embeddings 601 for the item can be generated, for example, using a concatenation operation that concatenates the image feature vector 602 and the text feature vector 604. The image feature vector 602 and the text feature vector 604 for an item may have a same or different number of feature values.

FIGS. 7A, 7B, and 7C illustrate an image similarity matrix 700, a text similarity matrix 730, and a combined similarity matrix 770, respectively. For example, the image similarity matrix 700 of FIG. 7A includes image similarity values that are a measure of similarity between image feature vectors of two items. For example, an image similarity value in a given cell of the image similarity matrix 700 is a measure of the similarity between an image feature vector of a first item corresponding to a row of the cell and an image feature vector of a second item corresponding to a column of the cell. For instance, an image similarity value 702 of 0.8 in a cell 704 is a measure of similarity between image feature vectors of a "D" item and an "E" item.

In some implementations, image similarity values are a value between zero and one, with a higher value indicating a higher similarity between respective image feature vectors. In some implementations, image similarity values are cosine similarity values. For example, a cosine similarity value can be calculated using a formula 706. Text similarity values and combined similarity values (described in more detail below) can also be cosine similarity values between zero and one.

The text similarity matrix 730 of FIG. 7B includes text similarity values that are a measure of similarity between text feature vectors of two items. A text similarity value in a given cell of the text similarity matrix 730 can be a measure of the similarity between a text feature vector of a first item corresponding to a row of the cell and a text feature vector of a second item corresponding to a column of the cell. For instance, a text similarity value 732 of 0.6 in a cell 734 is a measure of similarity between text feature vectors of an "A" item and the "E" item.

For two given items, an image similarity value for the items and a text similarity value for the items may be a same or different value. For example, a text similarity value 736 of 0.9 for the "D" and "E" items is a different value than the image similarity value 702 of 0.8 for the "D" and "E" items. The text similarity value 736 of 0.9 is larger than the image similarity value 702 of 0.8, which can indicate that text values of the "D" and "E" items are more similar than images of the "D" and "E" items. The text similarity value 732 of 0.6 is lower than the text similarity value 736 of 0.9, which can indicate that the text value of the "E" item is more similar to the text value of the "D" item than the text value of the "A" item.

The combined similarity matrix 770 of FIG. 7C includes combined similarity values that are a measure of similarity between combined feature vectors of two items. A combined similarity value in a given cell of the combined similarity matrix 770 can be a measure of the similarity between a combined feature vector of a first item corresponding to a row of the cell and a combined feature vector of a second item corresponding to a column of the cell. For instance, a combined similarity value 772 of 0.6 in a cell 774 is a measure of similarity between combined feature vectors of a "C" item and the "E" item.

FIG. 8 is a diagram 800 that illustrates filtering and joining operations performed on similarity lists. As described above, filtering can be performed on similarity lists so that only those similarity values that are above a predetermined threshold remain included in a respective similarity list. For example, filtered matches 802, 804, and 806 can be generated by performing a filtering operation on the image similarity matrix 700, the text similarity matrix 730, or the combined similarity matrix 770, respectively. For example, a predetermined similarity value threshold can be 0.59, and similarity values in the image similarity matrix 700, the text similarity matrix 730, or the combined similarity matrix 770 that are less than or equal to the threshold of 0.59 can be excluded when the filtered matches 802, 804, and 806 are generated, respectively.

As described above, joint similarity lists 808 can be generated, for each item, based on the filtered matches 802, 804, and 806 for the item. For an item, when another similar item is included in only one of the filtered matches 802, 804, or 806, that similar item and a similarity value can be included in the joint similarity list for the item. For example, for the item "C", the filtered matches 802, 804, and 806 only include one similarity value between the item "C" and the item "B" (e.g., an image embeddings similarity value 810 of 0.6 in the filtered matches 802). Accordingly, a joint similarity list 812 for the item "C" includes a corresponding similarity value of 0.6 814 for the item "B".

As another example, for each item, when another similar item is included in multiple of the filtered matches 802, 804, and 806, an average of similarity values can be computed for the similar item in the filtered matches 802, 804, and 806 for the item and the average similarity value can be included in a joint similarity list for the item. For instance, for the item "A", each of the filtered matches 802, 804, and 806 includes a similarity value that measures the similarity of respective embeddings vectors between the item "A" and the item "E". Accordingly, an average computation 816 can be performed to compute an average of the similarity values for the item "E" in the filtered matches 802, 804, and 806 for the item "A". A computed average 818 of 0.7 for the item "E" can be included in a joint similarity list 820 for the item "A". In some implementations, the joint similarity lists 808 can be used as final similarity lists for each item. In other implementations, more-refined similarity lists can be generated by each item using a graph-blending approach.

Figure 9:
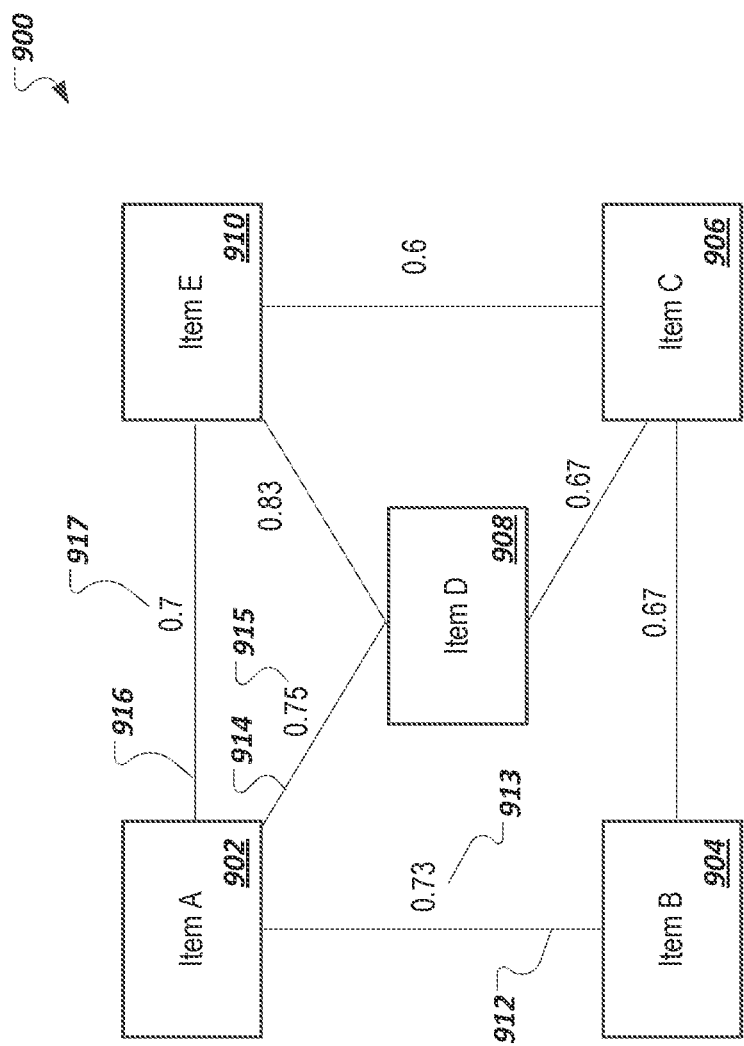
FIG. 9 illustrates an item graph that is generated based on joint similarity lists.

FIG. 9 illustrates an item graph 900 that illustrates joint similarity list information. The item graph 900 is another representation of information included in joint similarity lists (e.g., the joint similarity lists 808 of FIG. 8). As described in more detail below, joint similarity list information (or information from the item graph 900) can be used to create refined similarity lists. As shown in FIG. 9, the item graph 900 includes a node for each item. For example, the item graph 900 includes nodes 902, 904, 906, 908, and 910 for items "A", "B", "C", "D", and "E", respectively. For each item, an edge can be included in the item graph 900 between the node for the item and a node for a similar item that is included in the joint similarity list for the item. An edge weight can be applied to the edge, where the edge weight can be the similarity value in the joint similarity list that represents the similarity between the item and the similar item.

For example, as described above with respect to FIG. 8, the joint similarity list 820 for the item "A" is: B(0.73), D(0.75), E(0.77). Accordingly, the item graph 900 can include a weighted edge 912 between the node 902 for the item "A" and the node 904 for the item "B", with an edge weight of 0.73 913 corresponding to the similarity value for the item "B" in the joint similarity list 820. Similarly, the item graph 900 can include a weighted edge 914 between the node 902 for the item "A" and the node 908 for the item "D", with an edge weight of 0.75 915 corresponding to the similarity value for the item "D" in the joint similarity list 820. The item graph 900 can also include a weighted edge 916 between the node 902 for the item "A" and the node 910 for the item "E", with an edge weight of 0.77 917 corresponding to the similarity value for the item "E" in the joint similarity list 820. The node 902 for the item "A" is not connected in the item graph 900 to the node 906 for the item "C". For instance, similarity values that measured a similarity between the item "A" and the item "C" may not have been more than a predetermined threshold (so may have been previously filtered out of a combined similarity list for the item "A"). As described below, information in the item graph 900 can be used to perform a graph blending process to create refined embeddings for each item in the repository. The refined embeddings can be used to generate refined similarity lists for each item.

Figure 10:
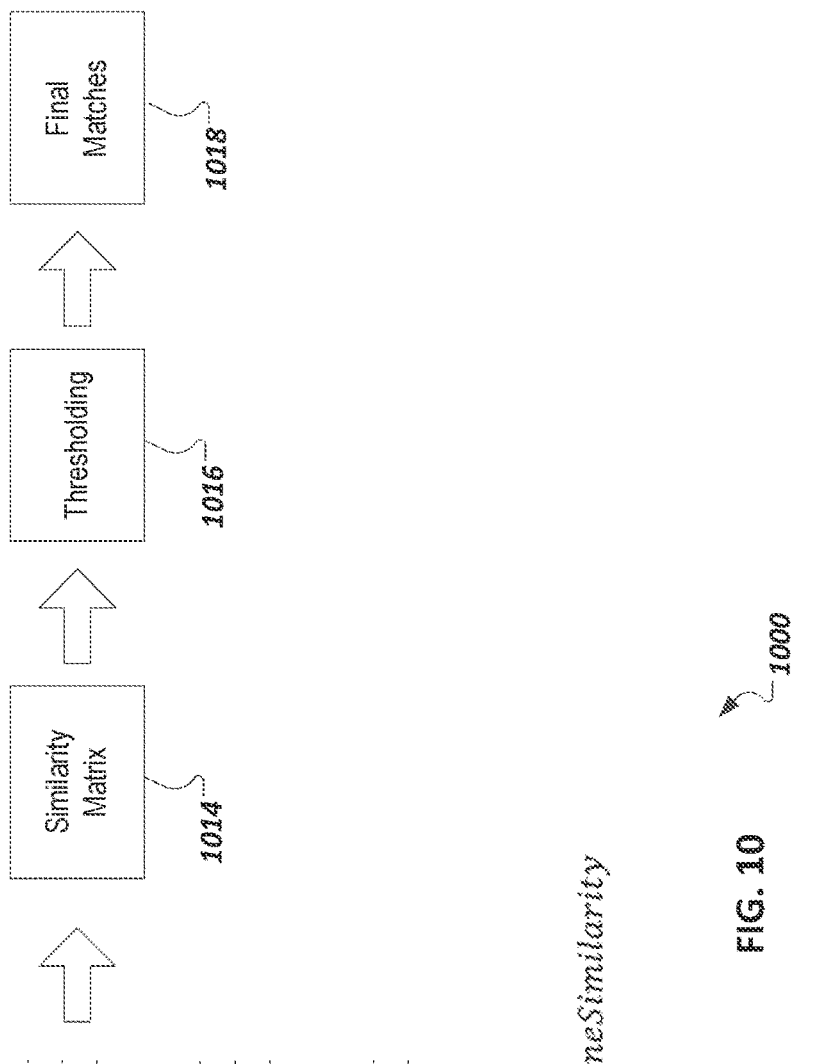
FIG. 10 is a diagram that illustrates refinement of combined embedding vectors.

FIG. 10 is a diagram 1000 that illustrates refinement of combined embedding vectors. As mentioned, a graph-blending process (which can use, for example, information from FIG. 8 or FIG. 9) can be used to create more-refined similarity lists than the joint similarity lists 808 of FIG. 8. For example, a combined embeddings vector for an item can be refined by using a graph blending process that includes merging the combined embeddings vector of the item with combined embeddings vectors for similar items to which the item is connected in the item graph based on weights of connected edges in an item graph (or based on corresponding logically-equivalent joint similarity list information). For example, formulas 1002, 1004, 1006, 1008, and 1010 can be used to create refined combined embedding vectors for the item "A", the item "B", the item "C", the item "D", and the item "E", respectively. Each formula 1002, 1004, 1006, 1008, and 1010 follows a general form of a formula 1012. That is, a refined combined embedding vector for a given item can be computed as a sum of products, where each product is a multiplication of a combined embedding vector by a corresponding similarity value. The combined embedding vectors that are used in the formula 1012 when applied to an item include the combined embedding vector for the item itself and combined embedding vectors of each similar item to which the item is connected in the item graph. For example, as shown in the formula 1002, a refined embedding vector for the item "A" (e.g., "NewVectorA") can be computed by using the combined embedding vector for the item "A" (multiplied by a value of one) and a sum of products that includes combined embedding vectors for the item "B", the item "D", and the item "E" to which the item "A" is connected in the item graph 900 multiplied by respective corresponding edge weights of the edges that connect the item "A" to similar items.

After refined combined embedding vectors are generated for each item, a similarity matrix 1014 can be generated based on the refined combined embedding vectors. The similarity matrix can be generated using a similar process as used to generate the image similarity matrix 700, the text similarity matrix 730, and the combined similarity matrix 770 described above with respect to FIGS. 7A, 7B, and 7C, respectively.

The combined similarity matrix 770 can include a refined similarity list for each item. The refined similarity lists for each item can be further refined using a thresholding process 1016 that can filter out any similar items in a refined similarity list that are less than a predetermined threshold. After the thresholding process 1016 is performed, each item can have, in a set of final matches 1018, a final similarity list that includes similar items with similarity values at or above the predetermined threshold. In some implementations, the predetermined threshold used for the thresholding process 1016 can be a higher threshold than used for thresholding processes 318, 320, and 322 described above with respect to FIG. 3. For example, a threshold used for the thresholding processes 318, 320, or 322 may be 0.6 and a threshold used for the thresholding process 1016 may be 0.9.

Generation of the final matches 1018 can also include a sorting process. For example, after the thresholding process 1016 is performed, a refined similarity list for an item k may have a format of: [i:cos(k, i), j:cos(k, j), ... m:cos(k, j),]. The refined similarity list for an item can be sorted in descending order by cosine similarity. For instance, a result of such sorting for an item k may yield a similar item list result with a format of: [item i, item j, item m ... ], with the most similar items to the item k being included as the leftmost items of the similar item list. If a request for similar items for the item k is received, a certain number of most similar items to the item k (e.g., n most similar items) can be retrieved from the similar item list for the item k and provided in response to the request.

Figure 11:
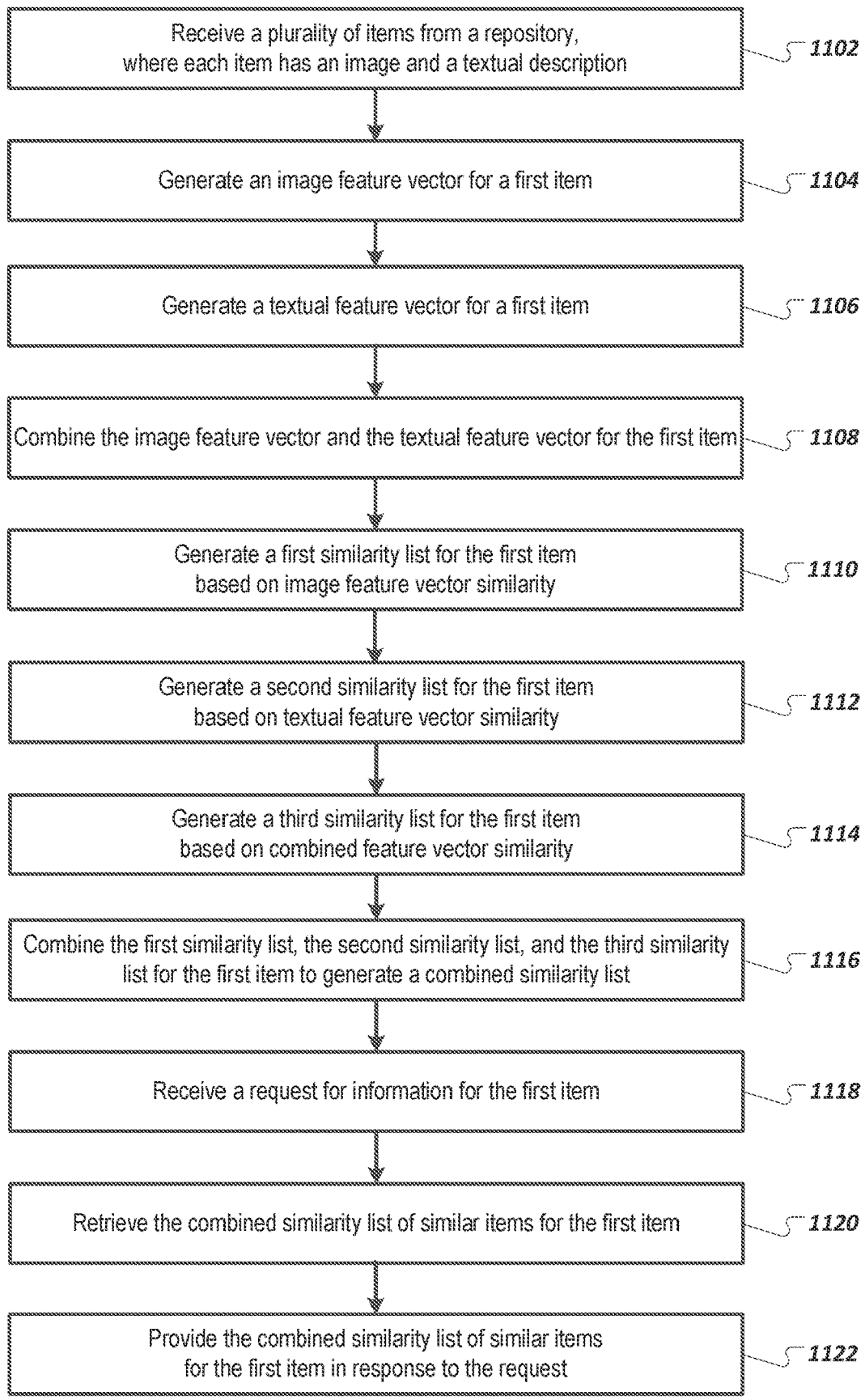
FIG. 11 depicts an example process that can be executed in accordance with implementations of the present disclosure.

FIG. 11 depicts an example process 1100 that can be executed in accordance with implementations of the present disclosure. In some examples, the example process 1100 is provided using one or more computer-executable programs executed by one or more computing devices. The example process 1100 is described as being performed for one item in a repository of items but the process 1100 can be repeated for each item in the repository.

A plurality of items is received from a repository of items (1102). Each item has both an image and a textual description. The items can be product items with a product image and a product description. Other types of items can be used.

An image feature vector is generated, for a first item, by processing an image of the first item using a first machine learning model (1104).

A textual feature vector is generated, for the first item, by processing a textual description of the first item using a second machine learning model (1106).

The image feature vector for the first item is combined with the textual feature vector for the first item, to generate a combined feature vector for the first item (1108).

A first similarity list of similar items is generated for the first item (1110). A respective similar item can be included in the first similarity list based on a similarity between an image feature vector for the first item and an image feature vector for the similar item. For example, a similar item can be included in the first similarity list for the first item list based on a cosine similarity value between the image feature vector of the similar item and the image feature vector of the first item being more than a predetermined threshold.

A second similarity list of similar items is generated for the first item (1112). A respective similar item can be included in the second similarity list based on a similarity between a text feature vector for the first item and a text feature vector for the similar item. For example, a similar item can be included in the second similarity list for the first item list based on a cosine similarity value between the textual feature vector of the similar item and the textual feature vector of the first item being more than a predetermined threshold.

A third similarity list of similar items is generated for the first item (1114). A respective similar item can be included in the third similarity list based on a similarity between a combined feature vector for the first item and a combined feature vector for the similar item. For example, a similar item can be included in the third similarity list for the first item list based on a cosine similarity value between the combined feature vector of the similar item and the combined feature vector of the first item being more than a predetermined threshold.

In some implementations, generating first similarity lists, second similarity lists, and third similarity lists can include generating respective similarity matrices. An entry in a given similarity matrix can represent a similarity value between respective image feature vectors, textual feature vectors, or combined feature vectors of two items in the repository.

The first similarity list for the first item, the second similarity list for the first item, and the third similarity list for the first item are combined to generate a combined similarity list of similar items for the first item (1116). In some implementations, when generating a combined similarity list for an item, a first set of similar items for the item are identified that are in only one of the first similarity list for the item, the second similarity list for the item, or the third similarity list for the item. The first set of similar items and respective similarity values can be included in the combined similarity list of similar items for the item. In some implementations, creating the combined similarity list of similar items for a respective item includes: identifying a second set of similar items for the item that are in more than one of the first similarity list for the item, the second similarity list for the item, or the third similarity list for the item; determining an average similarity value for the second set of similar items; and including the second set of similar items and the average similarity value for the second set of similar items in the combined similarity list of similar items for the item.

In some implementations, the combined similarity lists are refined using a graph blending process. For example, the combined similarity list information can be logically equivalent to a weighted graph that represents respective combined similarity lists of respective items in the repository. The weighted graph can include a node for each item and a weighted edge between similar items, where a weight for an edge between two respective similar items corresponds to a similarity value for the two similar items that is included in the combined similarity lists of each of the two similar items. The weighted graph can be used to generate revised similarity lists for the items in the repository.

In further detail, an updated feature vector can be generated for each respective item in the repository based on the combined feature vector for the item, the combined feature vector of similar items connected to the item in the weighted graph, and the weights of the weighted edges of the similar items connected to the item in the weighted graph. An updated similarity list can be generated for each respective item based on similarity values between an updated feature vector of the item and updated feature vectors of other items in the repository. The updated similarity list for each respective item can be filtered to generate a filtered similarity list that includes similar items that have a similarity value for the item that is greater than a predetermined threshold.

A request for information for the first item in the repository is received (1118).

The combined similarity list of similar items for the first item is retrieved (1120). As another example, if graph blending and further filtering are performed, the filtered similarity list for the first item can be retrieved.

The combined similarity list of similar items for the first item is provided in response to the request (1122). As another example, if graph blending and further filtering are performed, the filtered similarity list for the first item can be provided.

Figure 12:
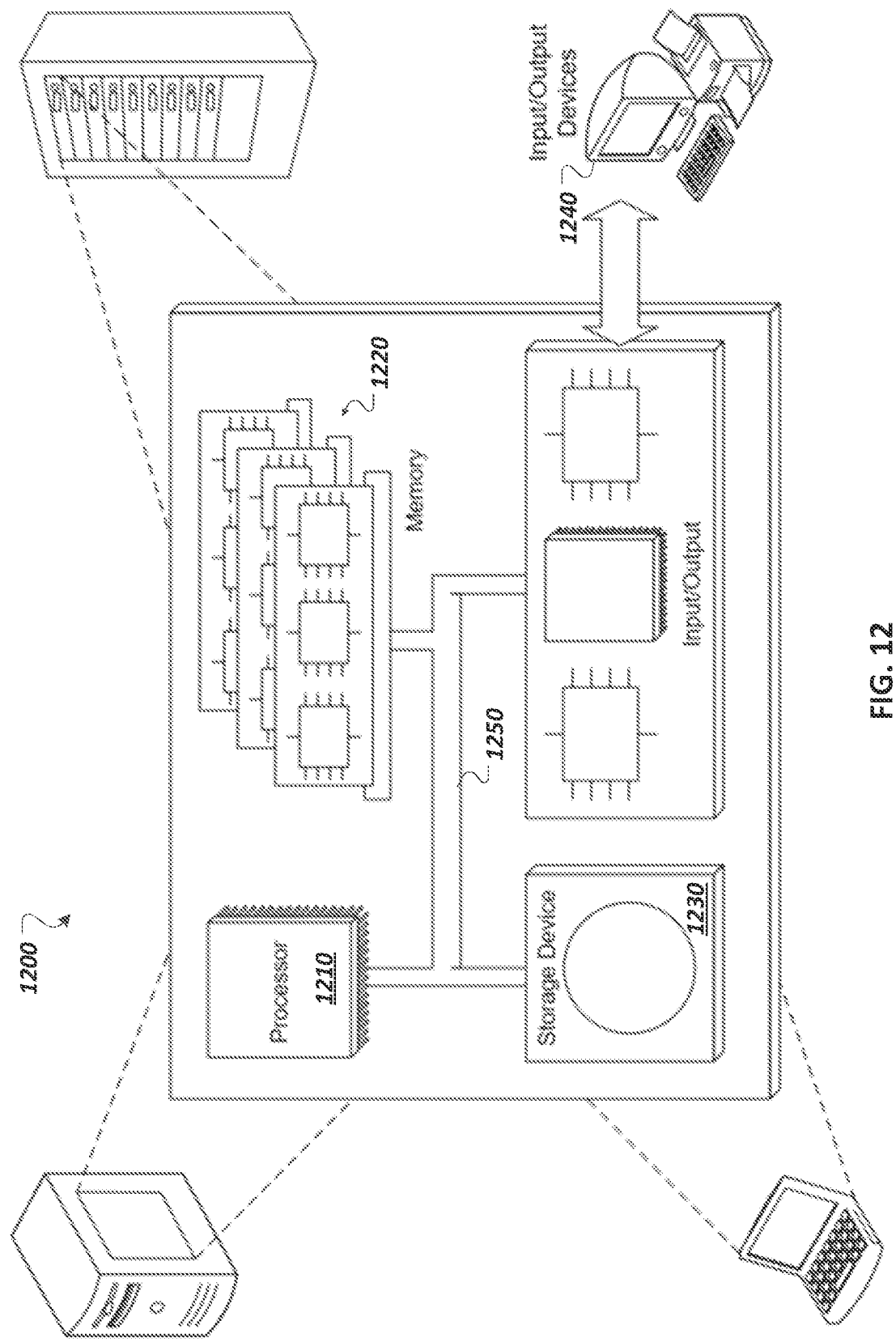
FIG. 12 is a schematic illustration of example computer systems that can be used to execute implementations of the present disclosure.

Referring now to FIG. 12, a schematic diagram of an example computing system 1200 is provided. The system 1200 can be used for the operations described in association with the implementations described herein. For example, the system 1200 may be included in any or all of the server components discussed herein. The system 1200 includes a processor 1210, a memory 1220, a storage device 1230, and an input/output device 1240. The components 1210, 1220, 1230, 1240 are interconnected using a system bus 1250. The processor 1210 is capable of processing instructions for execution within the system 1200. In some implementations, the processor 1210 is a single-threaded processor. In some implementations, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In some implementations, the memory 1220 is a computer-readable medium. In some implementations, the memory 1220 is a volatile memory unit. In some implementations, the memory 1220 is a non-volatile memory unit. The storage device 1230 is capable of providing mass storage for the system 1200. In some implementations, the storage device 1230 is a computer-readable medium. In some implementations, the storage device 1230 may be a floppy disk device, a hard disk device, an optical disk device, or a tape device. The input/output device 1240 provides input/output operations for the system 1200. In some implementations, the input/output device 1240 includes a keyboard and/or pointing device. In some implementations, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method comprising:
   receiving from a repository a plurality of items, wherein each item has an image and a textual description associated therewith;
   generating a first image feature vector, for a first item, by processing a respective image using a first machine learning model;
   generating a first textual feature vector, for the first item, by processing a respective textual description using a second machine learning model;
   combining, for the first item, the first image feature vector for the first item and the first textual feature vector for the first item, to generate a first combined feature vector for the first item;
   generating, for the first item, a first similarity list of similar items, wherein a first similar item is included in the first similarity list based on a similarity between the first image feature vector for the first item and a similar image feature vector for the similar item;
   generating, for the first item, a second similarity list of similar items, wherein a second similar item is included in the second similarity list based on a similarity between the first text feature vector for the first item and a similar text feature vector for the second similar item;
   generating, for the first item, a third similarity list of similar items, wherein a third similar item is included in the third similarity list based on a similarity between the first combined feature vector for the first item and a similar combined feature vector for the third similar item;
   combining the first similarity list for the first item, the second similarity list for the first item, and the third similarity list for the first item to generate a combined similarity list for the first item by:
      identifying a first set of similar items for the first item that are in only one of the first similarity list for the first item, the second similarity list for the first item, or the third similarity list for the first item, and
      including the first set of similar items and respective similarity values for the first set of similar items in the combined similarity list of similar items for the first item;
   receiving a request for information for the first item;
   retrieving the combined similarity list of similar items for the first item; and
   providing the combined similarity list of similar items for the first item in response to the request.

2. The computer-implemented method of claim 1, wherein a similar item is included in the first similarity list for the first item based on a cosine similarity value between the image feature vector of the similar item and the image feature vector of the first item being more than a predetermined threshold.

3. The computer-implemented method of claim 1, wherein a similar item is included in the second similarity list for the first item based on a cosine similarity value between the textual feature vector of the similar item and the textual feature vector of the first item being more than a predetermined threshold.

4. The computer-implemented method of claim 1, wherein a similar item is included in the third similarity list for the first item based on a cosine similarity value between the combined feature vector of the similar item and the combined feature vector of the first item being more than a predetermined threshold.

5. The computer-implemented method of claim 1, wherein generating first similarity lists, second similarity lists, and third similarity lists comprises generating respective similarity matrices, wherein an entry in a given similarity matrix comprises a similarity value between respective image feature vectors, textual feature vectors, or combined feature vectors of two items in the repository.

6. The computer-implemented method of claim 1, wherein creating the combined similarity list of similar items for the first item comprises:
   identifying a second set of similar items for the first item that are in more than one of the first similarity list for the first item, the second similarity list for the first item, or the third similarity list for the first item;
   determining an average similarity value for the second set of similar items; and
   including the second set of similar items and the average similarity value for the second set of similar items in the combined similarity list of similar items for the first item.

7. The computer-implemented method of claim 1, wherein the first machine learning model is a neural network model, and the second machine learning model is a natural language processing model.

8. A system, comprising:
- a computing device; and
- a computer-readable storage device coupled to the computing device and having instructions stored thereon which, when executed by the computing device, cause the computing device to perform operations for automatic index creation for relational database systems, the operations comprising:
receiving from a repository a plurality of items, wherein each item has an image and a textual description associated therewith;
- generating a first image feature vector, for a first item, by processing a respective image using a first machine learning model;
- generating a first textual feature vector, for the first item, by processing a respective textual description using a second machine learning model;
- combining, for the first item, the first image feature vector for the first item and the first textual feature vector for the first item, to generate a first combined feature vector for the first item;
- generating, for the first item, a first similarity list of similar items, wherein a first similar item is included in the first similarity list based on a similarity between the first image feature vector for the first item and a similar image feature vector for the similar item;
- generating, for the first item, a second similarity list of similar items, wherein a second similar item is included in the second similarity list based on a similarity between the first text feature vector for the first item and a similar text feature vector for the second similar item;
- generating, for the first item, a third similarity list of similar items, wherein a third similar item is included in the third similarity list based on a similarity between the first combined feature vector for the first item and a similar combined feature vector for the third similar item;
- combining the first similarity list for the first item, the second similarity list for the first item, and the third similarity list for the first item to generate a combined similarity list for the first item by:
  - identifying a first set of similar items for the first item that are in only one of the first similarity list for the first item, the second similarity list for the first item, or the third similarity list for the first item, and
  - including the first set of similar items and respective similarity values for the first set of similar items in the combined similarity list of similar items for the first item;
- receiving a request for information for the first item;
- retrieving the combined similarity list of similar items for the first item; and
- providing the combined similarity list of similar items for the first item in response to the request.

9. The system of claim 8, wherein a similar item is included in the first similarity list for the first item based on a cosine similarity value between the image feature vector of the similar item and the image feature vector of the first item being more than a predetermined threshold.

10. The system of claim 8, wherein a similar item is included in the second similarity list for the first item based on a cosine similarity value between the textual feature vector of the similar item and the textual feature vector of the first item being more than a predetermined threshold.

11. The system of claim 8, wherein a similar item is included in the third similarity list for the first item based on a cosine similarity value between the combined feature vector of the similar item and the combined feature vector of the first item being more than a predetermined threshold.

12. The system of claim 8, wherein generating first similarity lists, second similarity lists, and third similarity lists comprises generating respective similarity matrices, wherein an entry in a given similarity matrix comprises a similarity value between respective image feature vectors, textual feature vectors, or combined feature vectors of two items in the repository.

13. A non-transitory computer-readable storage medium coupled to one or more processors and having instructions stored thereon which, when executed by the one or more processors, cause the one or more processors to perform operations for automatic index creation for relational database systems, the operations comprising:
- receiving from a repository a plurality of items, wherein each item has an image and a textual description associated therewith;
- generating a first image feature vector, for a first item, by processing a respective image using a first machine learning model;
- generating a first textual feature vector, for the first item, by processing a respective textual description using a second machine learning model;
- combining, for the first item, the first image feature vector for the first item and the first textual feature vector for the first item, to generate a first combined feature vector for the first item;
- generating, for the first item, a first similarity list of similar items, wherein a first similar item is included in the first similarity list based on a similarity between the first image feature vector for the first item and a similar image feature vector for the similar item;
- generating, for the first item, a second similarity list of similar items, wherein a second similar item is included in the second similarity list based on a similarity between the first text feature vector for the first item and a similar text feature vector for the second similar item;
- generating, for the first item, a third similarity list of similar items, wherein a third similar item is included in the third similarity list based on a similarity between the first combined feature vector for the first item and a similar combined feature vector for the third similar item;
- combining the first similarity list for the first item, the second similarity list for the first item, and the third similarity list for the first item to generate a combined similarity list for the first item by:
  - identifying a first set of similar items for the first item that are in only one of the first similarity list for the first item, the second similarity list for the first item, or the third similarity list for the first item, and
  - including the first set of similar items and respective similarity values for the first set of similar items in the combined similarity list of similar items for the first item;
- receiving a request for information for the first item;
- retrieving the combined similarity list of similar items for the first item; and
- providing the combined similarity list of similar items for the first item in response to the request.

14. The computer-readable storage medium of claim 13, wherein a similar item is included in the first similarity list for the first item based on a cosine similarity value between the image feature vector of the similar item and the image feature vector of the first item being more than a predetermined threshold.

15. The computer-readable storage medium of claim 13, wherein a similar item is included in the second similarity list for the first item based on a cosine similarity value between the textual feature vector of the similar item and the textual feature vector of the first item being more than a predetermined threshold.

16. The computer-readable storage medium of claim 13, wherein a similar item is included in the third similarity list for the first item based on a cosine similarity value between the combined feature vector of the similar item and the combined feature vector of the first item being more than a predetermined threshold.

17. The computer-readable storage medium of claim 13, wherein generating first similarity lists, second similarity lists, and third similarity lists comprises generating respective similarity matrices, wherein an entry in a given similarity matrix comprises a similarity value between respective image feature vectors, textual feature vectors, or combined feature vectors of two items in the repository.

* * * * *